(12) United States Patent
Wang et al.

(10) Patent No.: US 11,799,756 B2
(45) Date of Patent: Oct. 24, 2023

(54) ROUTE LEARNING METHOD, PACKET FORWARDING METHOD AND DEVICE, AND STORAGE MEDIUM

(71) Applicant: Huawei Technologies Co., Ltd., Shenzhen (CN)

(72) Inventors: Haibo Wang, Beijing (CN); Shunwan Zhuang, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/671,695

(22) Filed: Feb. 15, 2022

(65) Prior Publication Data
US 2022/0173997 A1    Jun. 2, 2022

Related U.S. Application Data

(63) Continuation of application No. PCT/CN2020/109315, filed on Aug. 14, 2020.

(30) Foreign Application Priority Data

Aug. 15, 2019  (CN) .......................... 201910754931.3
Oct. 17, 2019  (CN) .......................... 201910988765.3

(51) Int. Cl.
*H04L 45/00*  (2022.01)
*H04L 45/02*  (2022.01)
*H04L 9/40*   (2022.01)

(52) U.S. Cl.
CPC .............. *H04L 45/04* (2013.01); *H04L 45/02* (2013.01); *H04L 45/08* (2013.01); *H04L 63/126* (2013.01)

(58) Field of Classification Search
CPC ......... H04L 45/04; H04L 45/02; H04L 45/08; H04L 63/126; H04L 63/0227;
(Continued)

(56) References Cited

U.S. PATENT DOCUMENTS 8,451,750 B2* 5/2013 Ward ..................... H04L 45/023
                                                          370/254
9,258,210 B2* 2/2016 Torvi .................. H04L 41/0813
(Continued)

FOREIGN PATENT DOCUMENTS

CN  101047565 A  10/2007
CN  101588343 A  11/2009
(Continued)

OTHER PUBLICATIONS

Haag et al., Protecting the Integrity of Internet Routing: Border Gateway Protocol (BGP) Route Origin Validation, NIST Special Publication 1800-14, 257 pages, Jun. 2019.*
(Continued)

*Primary Examiner* — Frank Duong
(74) *Attorney, Agent, or Firm* — Conley Rose, P.C.

(57) ABSTRACT

A route learning method includes a network device obtaining Border Gateway Protocol (BGP) routing information from a BGP peer. When a target region to which the BGP peer belongs is the same as a target region to which a BGP route belongs, the network device learns the BGP routing information. A packet forwarding method includes a network device receiving a packet through a network interface. When a target region to which the network interface belongs is the same as a target region to which the packet belongs, the network device forwards the packet.

23 Claims, 10 Drawing Sheets

(58) Field of Classification Search
CPC ............. H04L 63/1416; H04L 63/1441; H04L 63/145; H04L 63/1483; H04L 63/1466
See application file for complete search history.

(56) References Cited

U.S. PATENT DOCUMENTS

| | | | |
|---|---|---|---|
| 10,447,653 B2* | 10/2019 | Holtmanns | ............. H04L 45/12 |
| 2007/0005784 A1* | 1/2007 | Hares | ................. H04L 45/04 709/230 |
| 2010/0080131 A1 | 4/2010 | Ward et al. | |
| 2010/0263041 A1* | 10/2010 | Shea | ................. H04L 63/1466 726/14 |
| 2011/0093612 A1 | 4/2011 | Murakami | |
| 2011/0271340 A1 | 11/2011 | Vaidyanathan et al. | |
| 2015/0092785 A1 | 4/2015 | Torvi | |
| 2015/0295881 A1 | 10/2015 | Anderson et al. | |

FOREIGN PATENT DOCUMENTS

| | | |
|---|---|---|
| CN | 102158497 A | 8/2011 |
| CN | 104518972 A | 4/2015 |
| CN | 105577669 A | 5/2016 |
| CN | 106656792 A | 5/2017 |
| CN | 108809827 A | 11/2018 |
| EP | 1775908 A1 | 4/2007 |
| EP | 3420702 B1 | 3/2022 |
| WO | 2017147166 A1 | 8/2017 |
| WO | WO-2017/0147166 * | 8/2017 |
| WO | 2017157801 A1 | 9/2017 |

OTHER PUBLICATIONS

Liu et al., Verification of Routes Using Region Authorization, Internet-Draft, 8 pages, Jul. 23, 2021.*
Chen et al., Verification of Routes Using Region Authorization, Internet-Draft, 18 pages, Jul. 8, 2021.*
Huston et al., Validation of Route Origination using the Resource Certificate PKI and ROAs, Internet-Draft, 8 pages, Nov. 11, 2010.*
G. Huston, et al, "Validation of Route Origination using the Resource Certificate PKI and ROAs," draft-ietf-sidr-roa-validation-10.txt, Nov. 11, 2010, 10 pages, XP015072581.

* cited by examiner

ROUTE LEARNING METHOD, PACKET FORWARDING METHOD AND DEVICE, AND STORAGE MEDIUM

CROSS-REFERENCE TO RELATED APPLICATIONS

This is a continuation of International Patent Application No. PCT/CN2020/109315 filed on Aug. 14, 2020, which claims priorities to Chinese Patent Application No. 201910754931.3 filed on Aug. 15, 2019 and Chinese Patent Application No. 201910988765.3 filed on Oct. 17, 2019. All of the aforementioned patent applications are hereby incorporated by reference in their entireties.

TECHNICAL FIELD

This application relates to the communications field, and in particular, to a route learning method, a packet forwarding method and device, and a storage medium.

BACKGROUND

In a network, Border Gateway Protocol (BGP) route-based security attacks occur every day. For example, an external internet service provider (ISP) may intercept user traffic by forging BGP routing information.

SUMMARY

This application provides a route learning method, a packet forwarding method and device, and a storage medium, to resolve a technical problem of forging BGP routing information by an external ISP, and improve network security.

According to a first aspect, this application provides a route learning method. The method is applied to a first network device in a BGP-based network. The network further includes a second network device, and the first network device communicates with the second network device over BGP. The method includes: The first network device obtains first BGP routing information of a BGP route from the second network device, where the first BGP routing information includes validation information; the first network device determines, based on the validation information, a target region to which the first BGP routing information belongs; and the first network device learns the first BGP routing information when the target region to which the first BGP routing information belongs is the same as a target region to which the second network device belongs.

The method may be performed by a provider edge (PE) device in the network. After receiving BGP routing information from a BGP peer, a network device performs region validation to ensure that the learned BGP routing information is authentic and reliable. This prevents an external ISP from forging the BGP routing information, and improves network security.

In a possible design, the method further includes: When the target region to which the first BGP routing information belongs is different from the target region to which the second network device belongs, the first network device discards the first BGP routing information, that is, the first network device does not store the BGP routing information. The BGP routing information whose region is inconsistent with the region of the second network device is discarded to ensure network security.

In a possible design, the method further includes: When the target region to which the first BGP routing information belongs is different from the target region to which the second network device belongs, the first network device sets a priority of the first BGP routing information to a first priority. The first priority is lower than a second priority. A priority of second BGP routing information is the second priority. A target region to which the second BGP routing information belongs is the same as the target region to which the second network device belongs. When the target region of the second network device is different from the target region of the BGP routing information, the BGP routing information is set to a lower priority, so that the BGP routing information whose region is inconsistent with the region of the second network device is not preferentially selected during subsequent route selection. This ensures network security.

In a possible design, the validation information includes a first original autonomous system (AS), and that the first network device determines, based on the validation information, a target region to which the first BGP routing information belongs includes: The first network device uses a target region to which the first original AS belongs as the target region to which the first BGP routing information belongs.

In this method, network devices in the BGP network are divided into different regions, and BGP routing information corresponds to a specific region based on an original AS carried in the BGP routing information.

In a possible design, the method further includes: The first network device obtains region information, where the region information includes a mapping relationship between identification information of the second network device and the target region to which the second network device belongs, and a mapping relationship between the first original AS and the target region to which the first original AS belongs; the first network device determines, based on the identification information of the second network device and the region information, the target region to which the second network device belongs; and the first network device determines, based on the first original AS and the region information, the target region to which the first original AS belongs.

In a possible design, before the first network device learns the first BGP routing information, the method further includes: The first network device determines that the first original AS is the same as a second original AS, where the second original AS is an original AS that is obtained from route origin authorization (ROA) data and that is corresponding to the first BGP routing information.

In this method, before determining, by using the original AS, the target region to which the BGP routing information belongs, the network device validates reliability of the original AS.

In a possible design, the target region includes a region, a region confederation, or a combination of a region and a region confederation.

According to a second aspect, this application provides a packet forwarding method. The method is applied to a first network device in a BGP-based network. The first network device includes a network interface. The method includes: the first network device receives a packet through the network interface, where the packet includes a source address; the first network device determines, based on the source address, a target region to which the packet belongs; and the first network device forwards the packet when a target region to which the network interface belongs is the same as the target region to which the packet belongs.

The method may be performed by a provider edge (PE) device in the network. After receiving the packet through the network interface, the network device performs region validation to ensure that a packet source is authentic and reliable before forwarding the packet. This prevents an external ISP from hijacking traffic in a local region by forging the BGP routing information, and improves network security.

In a possible design, the method further includes: The first network device discards or records the packet when the target region to which the network interface belongs is different from the target region to which the packet belongs.

In a possible design, the source address is corresponding to first BGP routing information, the first BGP routing information further includes a first original autonomous system AS, and that the first network device determines, based on the source address, a target region to which the packet belongs includes: The first network device uses a target region to which the first original AS belongs as the target region to which the packet belongs.

In a possible design, the network further includes a second network device. The first network device communicates with the second network device over BGP. The first network device is connected to the second network device through the network interface. The method further includes: The first network device obtains region information, where the region information includes a mapping relationship between identification information of the second network device and the target region to which the network interface belongs, and a mapping relationship between the first original AS and the target region to which the first original AS belongs; the first network device determines, based on the identification information of the second network device and the region information, the target region to which the network interface belongs; and the first network device determines, based on the first original AS and the region information, the target region to which the first original AS belongs.

In a possible design, before the first network device forwards the packet, the method further includes: The first network device determines that the first original AS is the same as a second original AS, where the second original AS is an original AS that is obtained from route origin authorization ROA data and to which the source address belongs.

According to a third aspect, this application provides a network device, to perform the method in any one of the first aspect or the possible implementations of the first aspect. Specifically, the network device includes units configured to perform the method in any one of the first aspect or the possible implementations of the first aspect.

According to a fourth aspect, this application provides a network device, to perform the method in any one of the second aspect or the possible implementations of the second aspect. Specifically, the network device includes units configured to perform the method in any one of the second aspect or the possible implementations of the second aspect.

According to a fifth aspect, this application provides a network device. The network device includes a processor, a network interface, and a memory. The network interface may be a transceiver. The memory may be configured to store program code, and the processor is configured to invoke the program code in the memory to perform the method in any one of the first aspect or the possible implementations of the first aspect. Details are not described herein again.

According to a sixth aspect, this application provides a network device. The network device includes a processor, a network interface, and a memory. The network interface may be a transceiver. The memory may be configured to store program code, and the processor is configured to invoke the program code in the memory to perform the method in any one of the second aspect or the possible implementations of the second aspect. Details are not described herein again.

According to a seventh aspect, this application provides a network device. The network device includes a main control board and an interface board. The main control board includes a first processor and a first memory. The interface board includes a second processor, a second memory, and an interface card. The main control board and the interface board are coupled. The first memory may be configured to store program code, and the first processor is configured to invoke the program code in the first memory to perform the following operations: determining, based on validation information, a target region to which first BGP routing information belongs; and learning the first BGP routing information when the target region to which the first BGP routing information belongs is the same as a target region to which a second network device belongs.

The second memory may be configured to store program code, and the second processor is configured to invoke the program code in the second memory to trigger the interface card to perform the following operation: obtaining the first BGP routing information from the second network device, where the first BGP routing information includes the validation information.

According to an eighth aspect, this application provides a network device. The network device includes a main control board and an interface board. The main control board includes a first processor and a first memory. The interface board includes a second processor, a second memory, and an interface card. The main control board and the interface board are coupled. The first memory may be configured to store program code, and the first processor is configured to invoke the program code in the first memory to perform the following operation: determining, based on a source address, a target region to which a packet belongs.

The second memory may be configured to store program code, and the second processor is configured to invoke the program code in the second memory to trigger the interface card to perform the following operations: receiving the packet through a network interface, where the packet includes the source address; and forwarding the packet when a target region to which the network interface belongs is the same as the target region to which the packet belongs.

According to a ninth aspect, this application provides a computer-readable storage medium. The computer-readable storage medium stores instructions. When the instructions are run on a computer, the computer is enabled to perform the methods in the foregoing aspects.

According to a tenth aspect, this application provides a computer program product including computer program instructions. When the computer program product runs on a network device, the network device is enabled to perform the method provided in any one of the first aspect, the second aspect, the possible implementations of the first aspect, or the possible implementations of the second aspect.

According to an eleventh aspect, this application provides a chip, including a memory and a processor. The memory is configured to store a computer program, and the processor is configured to invoke and run the computer program in the memory, to perform the method in any one of the first aspect or the possible implementations of the first aspect, or perform the method in any one of the second aspect or the possible implementations of the second aspect.

Optionally, the chip includes only the processor, and the processor is configured to read and execute the computer program stored in the memory. When the computer program is executed, the processor performs the method in any one of the first aspect or the possible implementations of the first aspect, or the processor performs the method in any one of the second aspect or the possible implementations of the second aspect.

DESCRIPTION OF EMBODIMENTS

The following describes embodiments of this application with reference to the accompanying drawings.

The Internet is a huge network of connected networks over a set of common protocols and relies on infrastructure to ensure network connectivity, service availability, and service trustworthiness. The current internet infrastructure mainly includes an inter-domain routing system (e.g., BGP), a domain name system (DNS), and a public key infrastructure (PKI). However, the current infrastructure lacks firm security and trustworthiness, and a current BGP does not have a security authentication mechanism for learning BGP routing information, BGP routing information-based security attacks such as source hijacking, path hijacking, and route leakage occur every day. Therefore, internet security is an urgent problem to be resolved. A resource public key infrastructure (RPKI) mechanism is introduced based on the BGP, to validate whether an origin of the BGP routing information is correct. The RPKI mechanism is used to deliver information required for attempting to validate the BGP routing information. Then, content carried in the BGP routing information is compared with the information delivered by the RPKI mechanism to check validity. Specifically, a distributed RPKI server collects information, for example, an original AS, a route prefix, and a mask, of BGP routing information initiated by internet service providers ISPs. In addition, when advertising the BGP routing information, the ISPs also need to add the original AS of the BGP routing information to the BGP routing information. A router is connected to the RPKI server, and locally stores a copy of ROA data. The ROA data includes a mapping relationship between the BGP routing information obtained from the RPKI server and the original AS. When receiving BGP routing information advertised by an external peer, the router determines, through comparison, whether the original AS carried in the BGP routing information is the same as an original AS to which the BGP routing information in the ROA data maps, to validate whether the BGP routing information received from the external peer is valid. This ensures that hosts in a management domain of the router can securely access external services.

Figure 1:
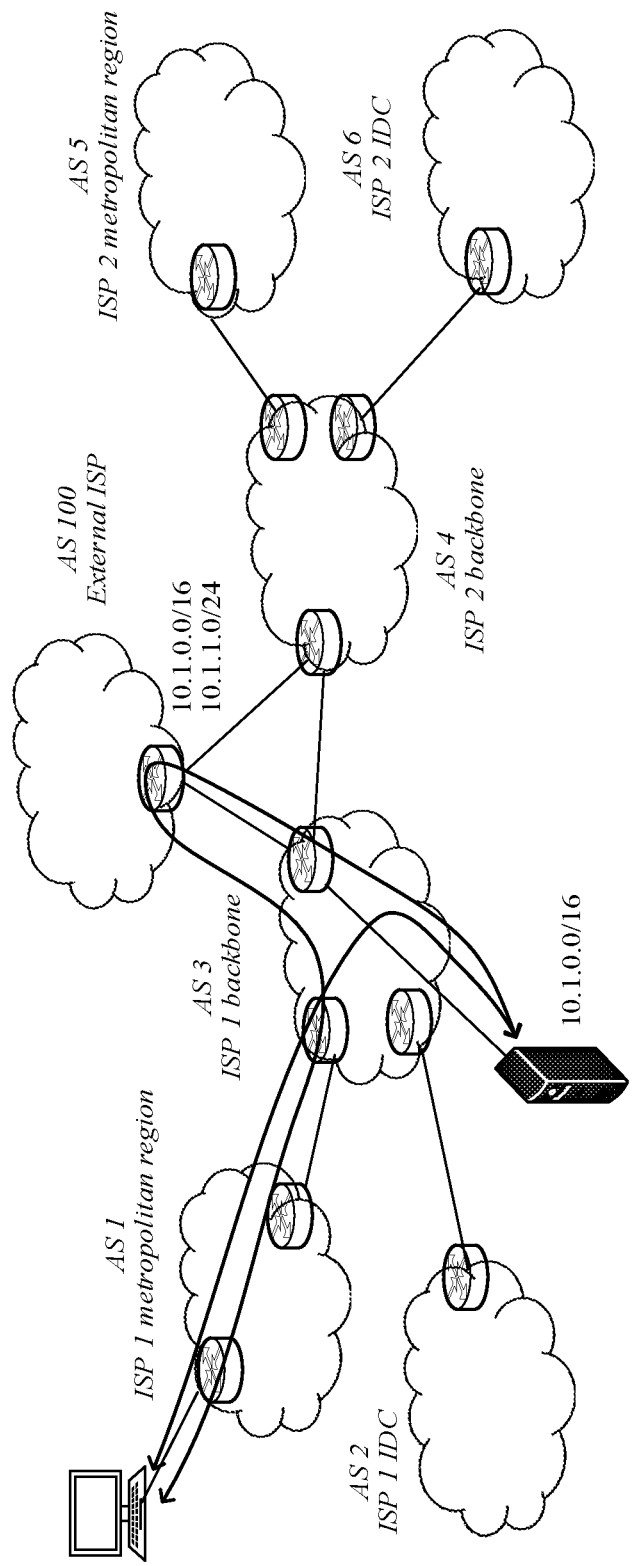
FIG. 1 is a schematic diagram of an application scenario according to an embodiment of this application.

A network scenario shown in FIG. 1 is used as an example. A destination server (10.1.0.0/16) accesses a backbone network of an ISP 1, and advertises routing information to an external AS. The destination server belongs to an AS 3, and the original AS carried in the routing information is the AS 3. In addition, a mapping relationship between the routing information related to 10.1.0.0/16 and the AS 3 is stored by the RPKI server in the ROA data. If an external ISP belonging to an AS 100 forges more precise routing information (10.1.1.0/24) of the server, the original AS carried in the routing information is the AS 100. The external ISP advertises the forged routing information to the backbone network of the ISP 1. The backbone network of the ISP 1 performs ROA validation, compares the forged routing information with routing information related to 10.1.0.0/16 to 10.1.1.0/24 in a ROA database, and finds that the original AS of the routing information should be the AS 3. However, the AS 100 carried in the routing information received from the external ISP does not match the AS 3. Therefore, the backbone network of the ISP 1 considers that the routing information received from the external ISP is invalid. In other words, this validation mode validates whether the routing information is secure and reliable by validating whether the original AS carried in the routing information is correct.

Figure 2:
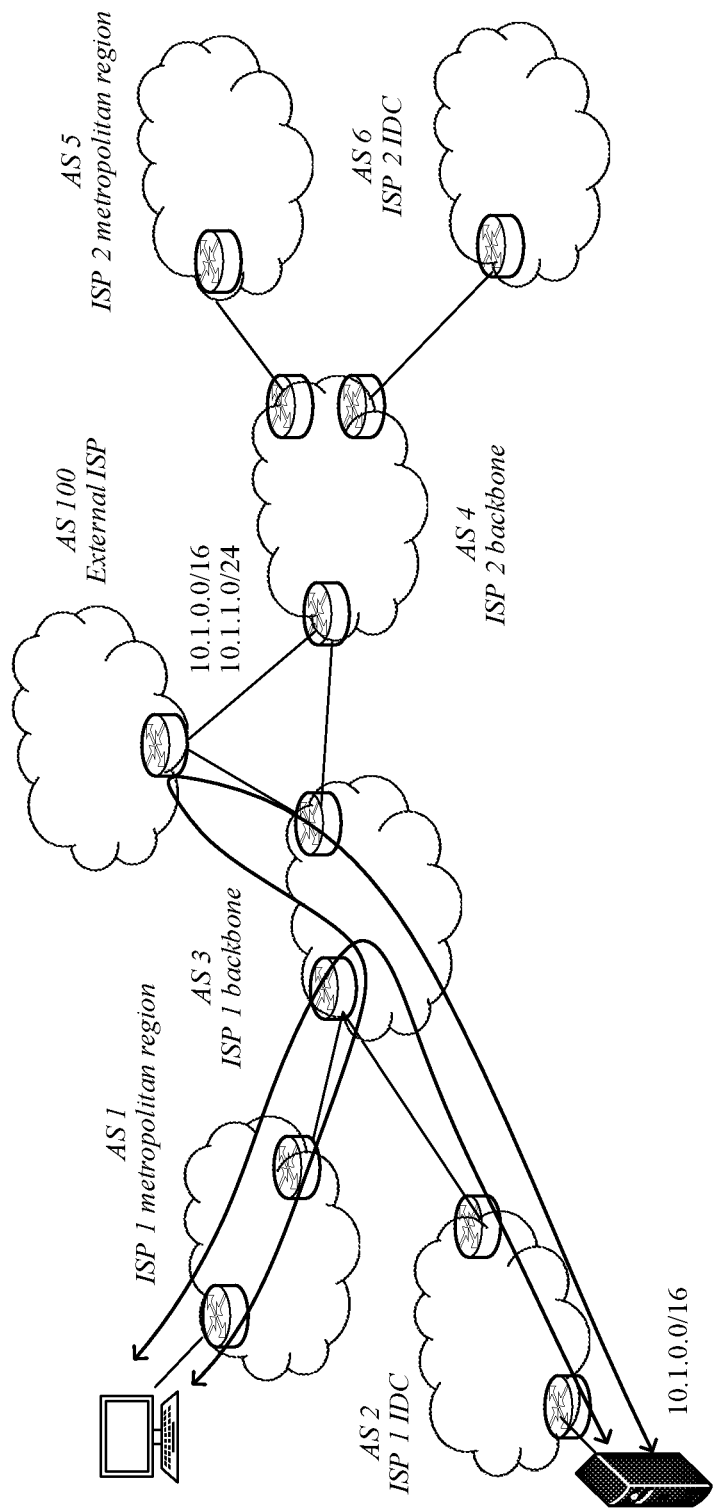
FIG. 2 is a schematic diagram of an application scenario according to an embodiment of this application.

However, this validation mode cannot defend against an attack mode in which the external ISP forges the original AS. A network scenario shown in FIG. 2 is used as an example. The destination server (10.1.0.0/16) accesses an Internet data center (IDC) of the ISP 1, and an AS to which the IDC belongs is the AS 2. The destination server (10.1.0.0/16) advertises the routing information related to 10.1.0.0/16 to an external AS, and the original AS carried in the routing information is the AS 3. Similarly, the mapping relationship between the routing information related to 10.1.0.0/16 and the AS 3 is stored by the RPKI server in the ROA data. If the external ISP wants to hijack traffic of a user accessing the server (10.1.0.0/16), the external ISP forges the routing information related to 10.1.1.0/24 and an original AS of the routing information, namely, the AS 2. The backbone network of the ISP 1 receives the routing information, related to 10.1.1.0/24, advertised by the external ISP, and the original AS is the AS 2. In this scenario, even if a ROA is deployed in the backbone network of the ISP 1 and the ROA is used to perform checking, it is considered that the original AS carried in the forged routing information is correct. Therefore, it is considered that the forged routing information is secure and reliable.

Embodiments of this application provide a route learning method, and a device and a system that are based on the method. The embodiments of the method, the device, and the system may be mutually referenced, and similarities are not described again. The method introduces a concept of a region, divides ASs into regions by setting attributes of the regions for the ASs in a network, and then uses the regions to check a learned route and a forwarded packet. A route in a region cannot be learned from outside the region. A packet whose source address is a local region cannot enter the local region from an interface of an external region, and a packet whose destination address is a local region cannot be sent by an interface of an external region. This improves network security.

Figure 3A:
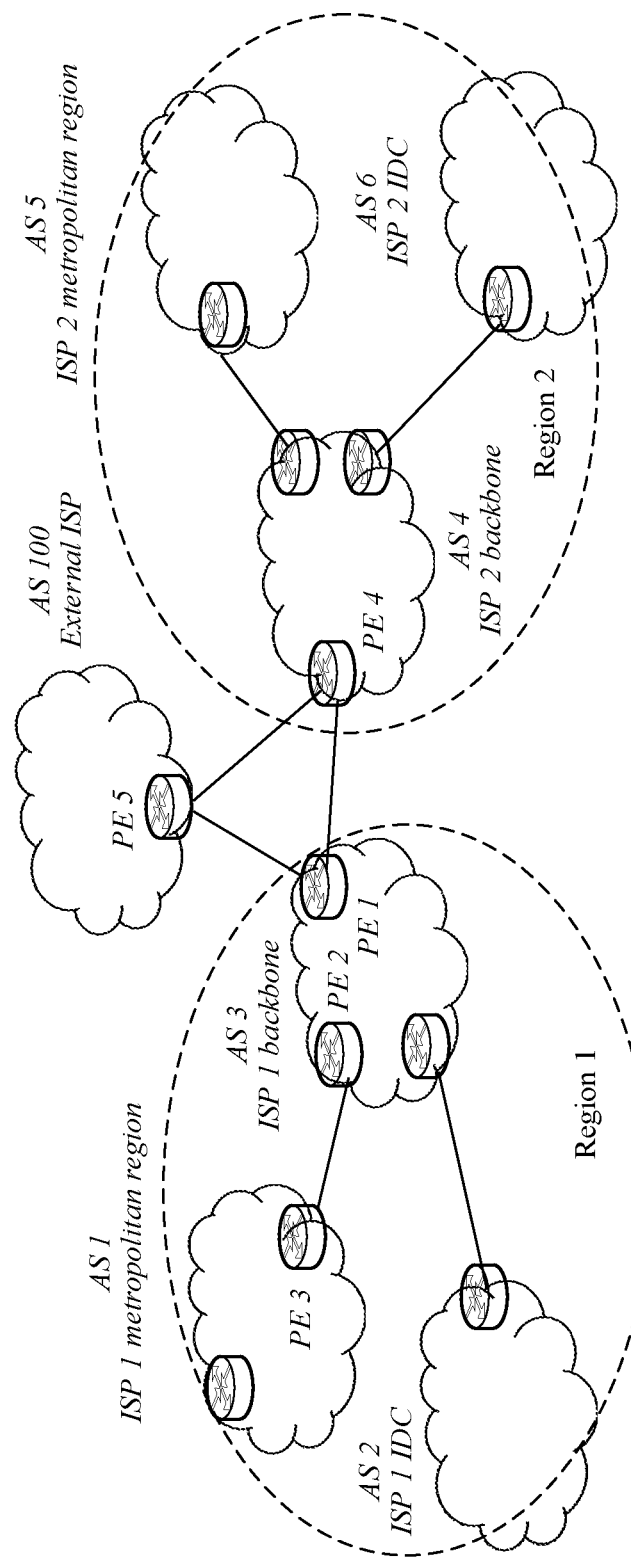
FIG. 3A is a schematic diagram of an application scenario according to an embodiment of this application.

FIG. 3A shows a possible application scenario according to an embodiment of this application. This scenario includes several ASs: an AS 1, the AS 2, the AS 3, the AS 100, and the like. The AS 3 may be the backbone network of the ISP 1, the AS 1 may be a metropolitan region network of the ISP 1, and the AS 2 may be the IDC of the ISP 1. An AS 4 may be a backbone network of an ISP 2, an AS 5 may be a metropolitan region network of the ISP 2, and an AS 6 may be an IDC of the ISP 2. The AS 100 may be a network of the external ISP. The AS 3 includes a provider edge (provider edge, PE) device 1 and a PE 2, the AS 1 includes a PE 3, the AS 4 includes a PE 4, and the AS 100 includes a PE 5. The PE 1 is separately connected to the PE 4 and the PE 5, the PE 2 is connected to the PE 3, and the PE 4 is connected to the PE 5.

A rule of dividing ASs into different regions includes but is not limited to: a plurality of interconnected sub-ISPs of one ISP are divided into one region, and if the ISP 1 further has a point of presence (POP), but the POP is not directly interconnected with another sub-ISP of the ISP 1, the POP is not divided into a region of the ISP 1.

As shown in FIG. 3A, the AS 1, the AS 2, and the AS 3 form a region 1, and the AS 4, the AS 5, and the AS 6 form a region 2. The PE 1 functions as a backbone egress device of the ISP 1, and the PE 4 functions as a backbone egress device of the ISP 2. Both the PE 1 and the PE 4 are connected to the PE 5 of the external ISP.

After the region division, an identifier may be allocated to each region, to distinguish different regions. For example, the allocated identifier may be a numeric number, and each region is numbered to obtain a region number. In this way, the regions are managed by using region numbers. For example, the region 1 and the region 2 may be managed by using region numbers.

Figure 3B:
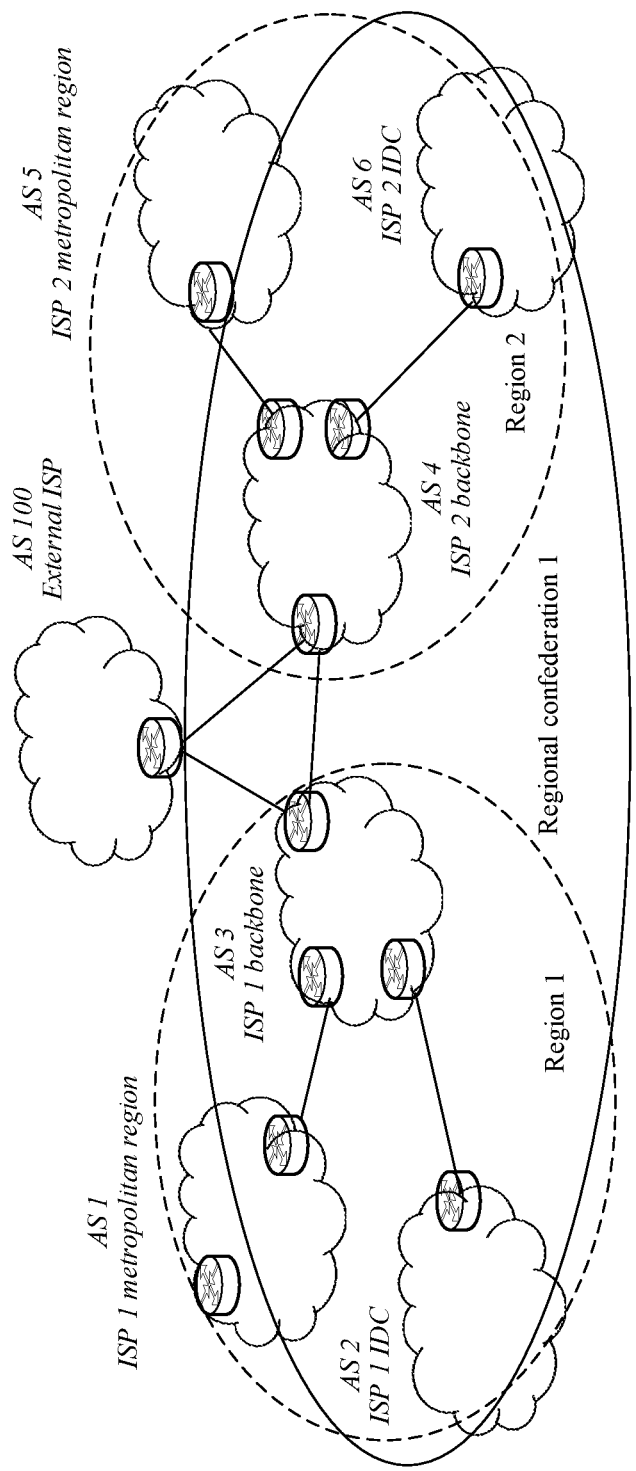
FIG. 3B is a schematic diagram of an application scenario according to an embodiment of this application.

In one example, a plurality of regions may form a region confederation. A rule of obtaining a region confederation through division includes but is not limited to: a plurality of directly interconnected regions in one area (for example, one country) are divided into one region confederation. As shown in FIG. 3B, the region 1 and the region 2 form a region confederation 1.

Similarly, after region confederations are obtained through division, each region confederation may be numbered to obtain a region confederation number. In this way, the region confederations are managed by using region confederation numbers.

In the method provided in this embodiment of this application, the region division may include division of regions, division of region confederations, or division of both regions and region confederations. For example, if only division into regions is required in this embodiment of this application, division into region confederations may not be required. If only division into region confederations is required in this embodiment of this application, division into regions may not be required. In this embodiment of this application, both division into regions and region confederations may be required.

A manner in which a region and a region confederation are numbered is not limited in this embodiment of this application. For example, number allocation for regions and region confederations may be managed by a national Internet registry (NIR).

In the network, a manner of division into regions and/or region confederations may be represented as region information. The region information may include an AS number, a region number, and/or a region confederation number. For example, the region information includes <region number, AS number>, or region confederation information includes <region confederation number, region number>. In the method provided in this embodiment of this application, the region information may not include the BGP routing information. In this case, the mapping relationship between the BGP routing information and the AS may be obtained from the ROA database.

Division into regions and/or region confederations and advertisement of the region information may be performed by a regional data server, or may be completed through network settings. The application scenario shown in FIG. 3A or FIG. 3B is used as an example. Each PE may be connected to the regional data server (not shown in the figure), and the regional data server delivers the region information to each PE device.

For example, for the region 1 shown in FIG. 3A, the regional data server sets a region number 1 for the region 1, and the region information, of network devices in the AS 1 in the region 1, delivered by the regional data server may be <1, 1>. In <1, 1>, the first 1 indicates the region 1, and the second 1 indicates the AS 1. To be specific, an AS to which the devices belong is the AS 1, and a region to which the devices belong is the region 1. Similarly, the region information, of network devices in the AS 2 and the AS 3, delivered by the regional data server is <1, 2> and <1, 3>. Similarly, for the region 2, the region information, of network devices in the AS 4, the AS 5, and the AS 6, delivered by the regional data server is <2, 4>, <2, 5>, and <2, 6>.

The network device determines, based on the region information, a region to which a BGP peer belongs. The application scenario shown in FIG. 3A is used as an example. The PE 1 determines, based on the region information, a region to which a BGP peer belongs, where a region to which the PE 4 belongs is the region 2. The PE 4 determines, based on the region information, a region to which a BGP peer belongs, where a region to which the PE 1 belongs is the region 1.

For example, for the region confederation 1 shown in FIG. 3B, the regional data server sets a region confederation number 1 for the region confederation 1, and region information, of network devices in the region 1 in the region confederation, delivered by the regional data server may be <1, 1>. In <1, 1>, the first 1 indicates the region confederation 1, and the second 1 indicates the region 1. To be specific, a region confederation to which the devices belong is the region confederation 1, and a region to which the devices belong is the region 1. Similarly, the region information, of network devices in the region 2, delivered by the regional data server may be <1, 2>.

Similarly, the network device determines, based on the region information, a region confederation to which a BGP peer belongs. The application scenario shown in FIG. 3B is used as an example. The PE 1 determines, based on the region information, a region confederation to which a BGP peer belongs, where a region confederation to which the PE 4 belongs is the region confederation 1. The PE 4 determines, based on the region information, a region confederation to which a BGP peer belongs, where a region confederation to which the PE 1 belongs is the region confederation 1.

Optionally, the region information may be manually configured on all network devices. In this case, there may be no regional server in the network.

Figure 4:
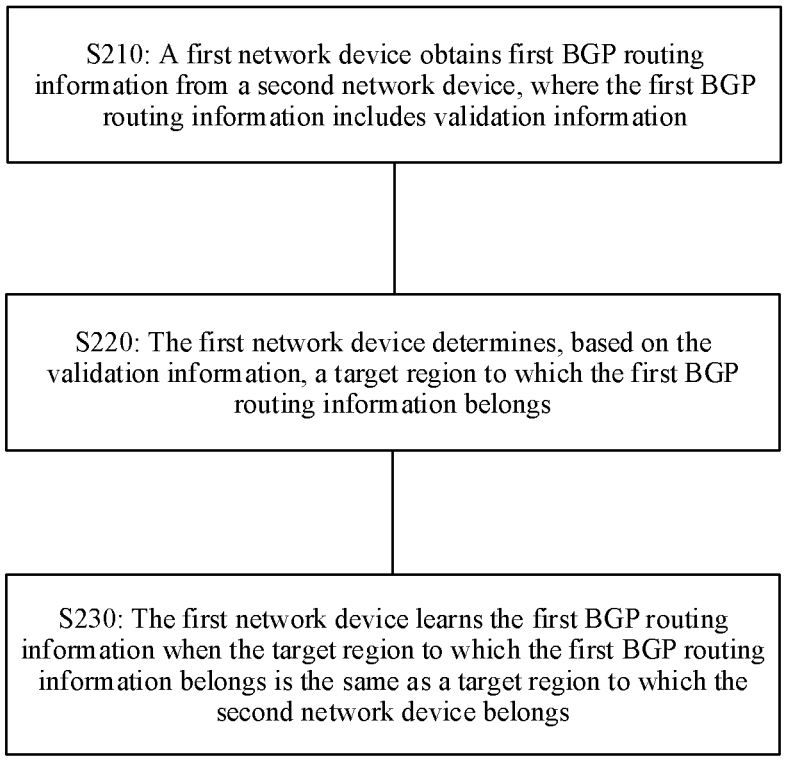
FIG. 4 is a schematic flowchart of a route learning method according to an embodiment of this application.

According to the concept of the region described above, authenticity and reliability of the BGP routing information can be validated in this embodiment of this application. Refer to FIG. 4. An embodiment of this application provides a route learning method. The method is applied to a first network device in a BGP-based network. The network further includes a second network device. The first network device communicates with the second network device over BGP. The method includes the following steps.

S210: The first network device obtains first BGP routing information from the second network device, where the first BGP routing information includes validation information.

In an example, an original AS carried in the BGP routing information may be used as the validation information.

S220: The first network device determines, based on the validation information, a target region to which the first BGP routing information belongs.

Optionally, the first network device uses a target region to which a first original AS belongs as the target region to which the first BGP routing information belongs. For example, the target region includes a region, a region confederation, or a combination of a region and a region confederation. For example, the first network device may use, as the region to which the first BGP routing information belongs, a region to which the original AS carried in the first BGP routing information belongs, the first network device may use, as the region to which the first BGP routing information belongs, a region confederation to which the original AS carried in the first BGP routing information belongs. Alternatively, the first network device may use, as the region to which the first BGP routing information belongs, a combination of the region and the region confederation to which the original AS carried in the first BGP routing information belongs.

With reference to the network scenario shown in FIG. 3A, the first network device may be the PE 1 in the backbone network of the ISP 1, the second network device may be the PE 4 in the backbone network of the ISP 2 or the PE 5 in the external ISP, and the PE 1 is connected to the PE 4 or the PE 5 over BGP. An address of a server (not shown in FIG. 3A) accessed by the PE 4 in the backbone network of the ISP 2 may be 10.1.0.0/16. The server advertises BGP routing information 1 to an external AS. A BGP prefix included in the BGP routing information 1 is 10.1.0.0/16. An original AS carried in BGP routing information 1 is the AS 65004, and the AS 65004 is used as the validation information. When the PE 1 in the backbone network of the ISP 1 receives the BGP routing information 1 from the PE 4, the PE 1 determines, based on the AS 65004 in the BGP routing information 1 and the obtained region information, that a region to which the AS 65004 belongs is the region 2. In this case, a region to which the BGP routing information 1 belongs is the region 2.

If the PE 5 in the external ISP belonging to the AS 65100 forges more precise BGP routing information 2 of the server, a BGP prefix included in the BGP routing information 2 is 10.1.1.0/24, and an original AS carried in the BGP routing information 2 is the AS 65004. The external ISP advertises the forged BGP routing information 2 to the PE 1 in the backbone network of the ISP 1, and the PE 1 determines, based on the AS 65004 in the BGP routing information 2 and the obtained region information, that the region to which the AS 65004 belongs is the region 2. In this case, a region to which the BGP routing information 2 belongs is the region 2.

With reference to the network scenario shown in FIG. 3B, an address of a server (not shown in FIG. 3B) accessed by the PE 4 in the backbone network of the ISP 2 may be 10.1.0.0/16. The server advertises BGP routing information 1 to an external AS. A BGP prefix included in the BGP routing information 1 is 10.1.0.0/16. An original AS carried in the BGP routing information 1 is the AS 65004, and the AS 65004 is used as the validation information. When the PE 1 in the backbone network of the ISP 1 receives the BGP routing information 1 from the PE 4, the PE 1 determines, based on the AS 65004 in the BGP routing information 1 and the obtained region information, that a region to which the AS 65004 belongs is the region confederation 1. In this case, a region to which the BGP routing information 1 belongs is the region confederation 1.

If the PE 5 in the external ISP belonging to the AS 65100 forges more precise BGP routing information 2 of the server, a BGP prefix included in the BGP routing information 2 is 10.1.1.0/24, and an original AS carried in the BGP routing information 2 is the AS 65004. The external ISP advertises the forged BGP routing information 2 to the PE 1 in the backbone network of the ISP 1, and the PE 1 determines, based on the AS 65004 in the BGP routing information 2 and the obtained region information, that the region to which the AS 65004 belongs is the region confederation 1. In this case, a region to which the routing information 2 belongs is the region confederation 1.

S230: The first network device learns the first BGP routing information when the target region to which the first BGP routing information belongs is the same as a target region to which the second network device belongs.

As described above, in the method provided in this embodiment of this application, a plurality of ASs in a network are divided into different regions and/or region confederations. Further, in the method, received routing information is checked, and only routing information that passes the check is learned. Routing information in a region cannot be learned from outside the region, and routing information in a region confederation cannot be learned from outside the region confederation. A network device checks BGP routing information according to the following rule: For routing information belonging to a local region, routing information received from a non-local-region peer is invalid or suspicious; for routing information belonging to a local region confederation, routing information received from a non-local-region confederation peer is invalid or suspicious.

Therefore, after obtaining the first BGP routing information from the second network device, the first network device first checks the BGP routing information. Specifically, the first network device compares the target region to which the first BGP routing information belongs with a target region to which a source device, namely, the second network device, of the BGP routing information belongs. Because the first network device communicates with the second network device over BGP, after a BGP peer between the first network device and the second network device is established, the source device of the first BGP routing information received over BGP peer is clearly the second network device. Further, the first network device can determine, based on identification information of the second network device and the region information, the target region to which the second network device belongs.

For example, when the target region to which the second network device belongs is the same as the target region to which the first BGP routing information belongs, the first network device learns the first BGP routing information. For example, the first network device adds the first BGP routing information to a routing table of the first network device.

In an example, when the target region to which the second network device belongs is different from the target region to which the first BGP routing information belongs, the first network device does not store the first BGP routing information. For example, local-region BGP routing information learned from a non-local-region peer is discarded, to ensure network security.

In an example, when the target region to which the second network device belongs is different from the target region to which the first BGP routing information belongs, the first network device may set the first BGP routing information to a low priority, for example, set the first BGP routing information to a low priority. Because the priority of the first BGP routing information is low, another route with a higher priority is preferentially used in a route selection process, to prevent the BGP routing information from being preferentially selected. This ensures network security. The first BGP routing information being set to the low priority may be that the priority of the first BGP routing information is set to a first priority. The first priority is lower than a second priority, and a priority of second BGP routing information is the second priority.

With reference to the network scenario shown in FIG. 3A, the first network device may be the PE 1 in the backbone network of the ISP 1, the second network device may be the PE 4 in the backbone network of the ISP 2 or the PE 5 in the external ISP, and the PE 1 is connected to the PE 4 or the PE 5 over BGP. The address of the server (not shown in FIG. 3A) accessed by the PE 4 in the backbone network of the ISP 2 may be 10.1.0.0/16. The server advertises the BGP routing information 1 to the external AS. The BGP prefix included in the BGP routing information 1 is 10.1.0.0/16. The original AS carried in the BGP routing information 1 is the AS 65004. When the PE 1 in the backbone network of the ISP 1 receives the BGP routing information 1 from the PE 4, the PE 1 determines that the region to which the AS 65004 belongs is the region 2. In this case, the region to which the BGP routing information 1 belongs is the region 2. In addition, the BGP routing information 1 is received from the PE 4, and the region to which the PE 4 belongs is also the region 2, which is the same as the region to which the BGP routing information 1 belongs. In this case, the PE 1 considers that the BGP routing information 1 is secure and reliable, and learns the BGP routing information 1. For example, the BGP routing information 1 is stored in a routing table, route selection is performed, the BGP routing information 1 is advertised, and a packet is forwarded by using the BGP routing information 1.

If the PE 5 in the external ISP belonging to the AS 65100 forges the more precise BGP routing information 2 of the server, the BGP prefix included in the BGP routing information 2 is 10.1.1.0/24, and the carried original AS is the AS 65004. The external ISP advertises the forged BGP routing information 2 to the PE 1 in the backbone network of the ISP 1, and the PE 1 determines that the region to which the BGP routing information 2 belongs is the region 2. In addition, the BGP routing information 2 is received from the PE 5, and a region to which the PE 5 belongs is not the region 2, which is not the same as the region to which the BGP routing information 2 belongs. In this case, the PE 1 considers that the BGP routing information 2 is invalid or suspicious, and does not learn the BGP routing information 2. For example, the BGP routing information 2 is discarded.

Therefore, beneficial effects brought by the technical solutions provided in this embodiment of this application include at least the following: preventing the external ISP from forging routing information to hijack routing information of a region to which a local ISP belongs, and preventing the external ISP from forging routing information to hijack routing information of a region confederation to which a local ISP belongs. This improves network security.

In an example, before the first network device determines, by using an original AS carried in BGP routing information, a target region to which the BGP routing information belongs, the first network device first performs ROA validation on the original AS. Specifically, the first network device determines whether the first original AS is the same as the original AS that is obtained from route origin authorization ROA data and that is corresponding to the BGP routing information. If the first original AS is the same as the original AS, the first network device further determines, by using the first original AS, the target region to which the BGP routing information belongs. If the first original AS is different from the original AS, this indicates that the first original AS may be forged, and the BGP routing information may also be forged. The first network device may directly discard the BGP routing information, or set the BGP routing information to a lower priority; and may not validate the target region to which the BGP routing information belongs.

For example, the ROA data may be locally stored after the first network device is connected to an RPKI server. For example, the first network device receives the ROA data from the RPKI server, and locally establishes a route validation database based on the received ROA data.

It should be noted that, only after the first network device determines that the first original AS obtained by using the BGP routing information from the second network device is the same as a second original AS that is obtained from the route origin authorization ROA data and that is corresponding to the BGP routing information, the first network device then determines whether the target region to which the second network device belongs is the same as the target region to which the BGP routing information belongs. This further improves network security. In addition, one region may include a plurality of ASs. If the target region to which the second network device belongs matches the target region to which the BGP routing information belongs, an original AS of a route may be another AS in the region. However, the other AS may not be the same as the actual original AS. In the method provided in this embodiment of this application, the first network device may further first determine whether the target region to which the second network device belongs is the same as the target region to which the BGP routing information belongs. After the target region to which the second network device belongs is the same as the target region to which the BGP routing information belongs, the first network device then determines whether the first original AS obtained by using the BGP routing information from the second network device is the same as the second original AS that is obtained from the route origin authorization ROA data and that is corresponding to the BGP routing information. This further improves network security.

For example, when determining that the target region to which the second network device belongs is different from the target region to which the BGP routing information belongs, the first network device may directly discard the BGP routing information, or directly reduce the priority of the BGP routing information, and may no longer determine whether the first original AS obtained by using the BGP routing information from the second network device is the same as the second original AS that is obtained from the route origin authorization ROA data and that is corresponding to the BGP routing information. This ensures network security and improves route learning efficiency.

This embodiment of this application does not limit a sequence of first determining whether the first original AS obtained by using the BGP routing information from the second network device is the same as the second original AS that is obtained from the ROA data and that is corresponding to the BGP routing information, or first determining whether the target region to which the second network device belongs is the same as the target region to which the BGP routing information belongs. Not only whether the first original AS obtained by using the BGP routing information from the second network device is the same as the second original AS that is obtained from the ROA data and that is corresponding to the BGP routing information is determined, but also whether the target region to which the second network device belongs is the same as the target region to which the BGP routing information belongs is determined. In this way, network security can be further improved.

Embodiments of this application provide a packet forwarding method, and a device and a system that are based on the method. The embodiments of the method, the device, and the system may be mutually referenced, and similarities are not described again.

Figure 5:
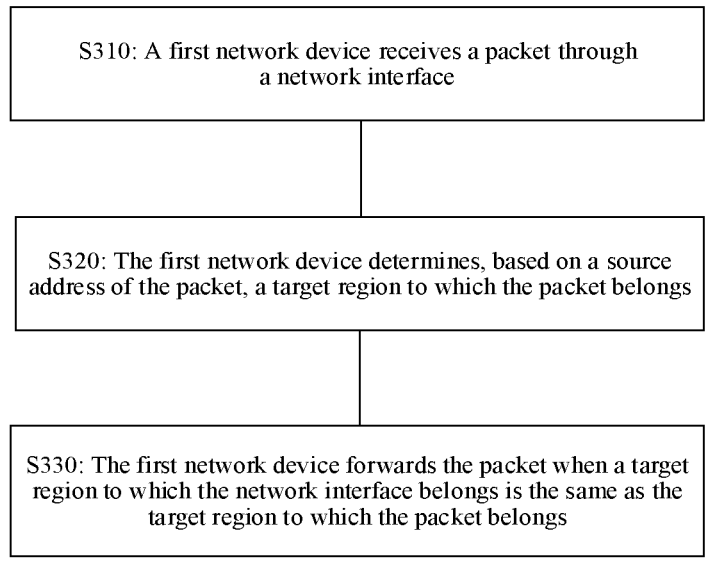
FIG. 5 is a schematic flowchart of a packet forwarding method according to an embodiment of this application.

Refer to FIG. 5. An embodiment of this application provides a packet forwarding method. The method is applied to a first network device in a BGP-based network. The first network device includes a network interface. The method includes the following steps.

S310: The first network device receives a packet through the network interface.

S320: The first network device determines, based on a source address of the packet, a target region to which the packet belongs.

The source address of the packet may be corresponding to specific BGP routing information. Specifically, the source address can match a BGP prefix in the BGP routing information according to a longest matching rule, or traffic sent to the source address can be routed by using the BGP routing information. The specific BGP routing information may carry an original AS.

Optionally, the first network device uses, as the target region to which the packet belongs, a target region to which the original AS carried in the BGP routing information belongs. For example, the target region includes a region, a region confederation, or a combination of a region and a region confederation. For example, the first network device uses, as the region to which the packet belongs, the region to which the original AS carried in the BGP routing information belongs, the first network device may use, as the region to which the packet belongs, a region confederation to which the original AS carried in the BGP routing information belongs, or the first network device may use, as the region to which the packet belongs, a combination of the region and the region confederation to which the original AS carried in the BGP routing information belongs.

With reference to the network scenario shown in FIG. 3A, the first network device may be the PE 1 in the backbone network of the ISP 1, the second network device may be the PE 4 in the backbone network of the ISP 2 or the PE 5 in the external ISP, and the PE 1 is connected to the PE 4 or the PE 5 over BGP. The address of the server (not shown in FIG. 3A) accessed by the PE 4 in the backbone network of the ISP 2 may be 10.1.0.0/16. The server advertises the BGP routing information 1 to the external AS. The BGP prefix included in the BGP routing information 1 is 10.1.0.0/16. The original AS carried in the BGP routing information 1 is the AS 65004. The PE 1 in the backbone network of the ISP 1 is connected to the PE 4 through a network interface A. In this case, the PE 1 receives the BGP routing information 1 from the PE 4 through the network interface A, and the PE 1 may further receive, from the PE 4, a packet 1 sent by the server. A source address of the packet 1 is the server address of 10.1.0.0/16. The PE 1 determines, based on the source address of the packet 1, that BGP routing information corresponding to the source address is the routing information 1, and determines, based on the AS 65004 in the BGP routing information 1 and the obtained region information, that the region to which the AS 65004 belongs is the region 2. In this case, the region to which the packet 1 belongs is the region 2.

If the packet sent by the server is hijacked by the PE 5 in the external ISP belonging to the AS 65100, the PE 4 is connected to the PE 5 through a network interface B, and the PE 4 receives, from the PE 5 through the network interface B, a packet 2 sent by the server. A source address of the packet 2 is the server address of 10.1.0.0/16. The PE 1 still determines, based on the source address of the packet 2, that routing information corresponding to the source address is the BGP routing information 1, and determines, based on the AS 65004 in the BGP routing information 1 and the obtained region information, that the region to which the AS 65004 belongs is the region 2. In this case, the region to which the packet 2 belongs is the region 2.

S330: The first network device forwards the packet when a target region to which the network interface belongs is the same as the target region to which the packet belongs.

As described above, in the method provided in this embodiment of this application, a plurality of ASs in a network are divided into different regions and/or region confederations. Further, in the method, a received packet is checked, and only a packet that passes the check is forwarded. A packet in a region cannot be received from outside the region, and a packet in a region confederation cannot be received from outside the region confederation. This improves network security. A network device checks a packet according to the following rule: A packet in a local region cannot be sent or received through a non-local-region interface, and a packet in a local region confederation cannot be sent or received through a non-local-region confederation interface.

Therefore, after receiving the packet by using the network interface, the first network device first checks the packet. Specifically, the first network device compares the target region to which the packet belongs with the target region to which the network interface used to receive the packet belongs. For example, the target region to which the network interface used to receive the packet belongs is a target region to which another network device, for example, the second network device, is connected by the first network device by using the network device.

For example, when the target region to which the packet belongs is the same as the target region to which the network interface used to receive the packet belongs, the first network device forwards the packet.

In an example, when the target region to which the packet belongs is different from the target region to which the network interface used to receive the packet belongs, the first network device discards or records the packet, to ensure network security.

With reference to the network scenario shown in FIG. 3A, the first network device may be the PE 1 in the backbone network of the ISP 1, the second network device may be the PE 4 in the backbone network of the ISP 2 or the PE 5 in the external ISP, and the PE 1 is connected to the PE 4 or the PE 5 over BGP. The address of the server (not shown in FIG. 3A) accessed by the PE 4 in the backbone network of the ISP 2 may be 10.1.0.0/16. The PE 1 in the backbone network of the ISP 1 receives, from the PE 4 through the network interface A, a packet 1 sent by the server. A source address of the packet 1 is the server address 10.1.0.0/16. The PE 1 determines, based on the source address of the packet 1, that a region to which the packet 1 belongs is the region 2. In addition, the PE 1 is connected to the PE 4 through the network interface A, and the region to which the PE 4 belongs is the region 2. In this case, the region to which the network interface A belongs is the region 2. Therefore, the region to which the packet 1 belongs is the same as the region to which the network interface used to receive the packet 1 belongs, and the PE 1 considers that the packet 1 is secure and reliable, and forwards the packet 1.

If the packet 2 sent by the server is hijacked by the PE 5 in the external ISP belonging to the AS 65100, the PE 4 is connected to the PE 5 through a network interface B, and the PE 4 receives, from the PE 5 through the network interface B, a packet 2 sent by the server. A source address of the packet 2 is the server address of 10.1.0.0/16. The PE 1 determines that a region to which the packet 2 belongs is the region 2. In addition, the PE 1 is connected to the PE 5 through the network interface B, and the region to which the PE 5 belongs is not the region 2. In this case, the region to which the network interface B belongs is not the region 2. Therefore, the region to which the packet 2 belongs is different from the region to which the network interface used to receive the packet 2 belongs, and the PE 1 considers that the packet 2 is suspicious, and does not forward the packet 1.

Therefore, beneficial effects brought by the technical solutions provided in this embodiment of this application include at least: preventing an external ISP from hijacking a packet in a region to which a local ISP belongs, and preventing an external ISP from hijacking a packet in a region confederation to which a local ISP belongs. This improves network security.

In an example, before the first network device determines, by using the original AS carried in the BGP routing information, the target region to which the packet belongs, the first network device first performs ROA validation on the original AS. Specifically, the first network device determines whether the first original AS is the same as the original AS that is obtained from route origin authorization ROA data and that is corresponding to the BGP routing information. If the first original AS is the same as the original AS, the first network device further determines, by using the first original AS, the target region to which the packet belongs. If the first original AS is different from the original AS, this indicates that the first original AS and the BGP routing information may also be forged. The first network device cannot determine, by using the original AS, the target region to which the packet belongs.

For example, the ROA data may be locally stored after the first network device is connected to an RPKI server.

It should be noted that only after the first network device determines that the first original AS to which the source address, of the packet, obtained by using the packet belongs is the same as a second original AS, the first network device determines whether the target region to which the network interface belongs is the same as the target region to which the packet belongs. In the method provided in this embodiment of this application, the first network device may further first determine whether the target region to which the network interface belongs is the same as the target region to which the packet belongs. After determining that the target region to which the network interface belongs is the same as the target region to which the packet belongs, the first network device determines whether the first original AS to which the source address, of the packet, obtained by using the packet belongs is the same as the second original AS. For example, when determining that the target region to which the network interface belongs is different from the target region to which the packet belongs, the first network device may directly discard the packet, and may no longer determine whether the first original AS to which the source address, of the packet, obtained by using the packet belongs is the same as the second original AS.

A sequence of first determining whether the target region to which the network interface belongs is the same as the target region to which the packet belongs, or first determining whether the first original AS to which the source address, of the packet, obtained by using the packet belongs is the same as the second original AS is not limited in this embodiment of this application. Not only whether the target region to which the network interface belongs is the same as the target region to which the packet belongs is determined, but also whether the first original AS to which the source address, of the packet, obtained by using the packet belongs is the same as the second original AS is determined. This can further improve network security.

Figure 6:
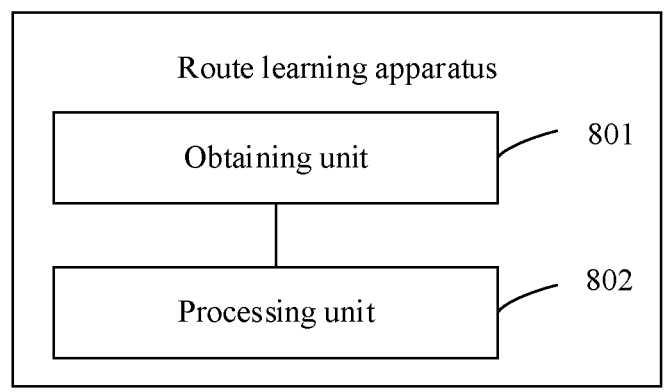
FIG. 6 is a schematic diagram of a structure of a network device according to an embodiment of this application.

An example embodiment provides a route learning apparatus. The apparatus is applied to a first network device in a BGP-based network. The network further includes a second network device. The first network device communicates with the second network device over BGP. As shown in FIG. 6, the apparatus includes: an obtaining unit 801, configured to obtain first BGP routing information from the second network device, where the first BGP routing information includes validation information; and a processing unit 802, configured to: determine, based on the validation information, a target region to which the first BGP routing information belongs, and learn the first BGP routing information when the target region to which the first BGP routing information belongs is the same as a target region to which the second network device belongs.

Figure 7:
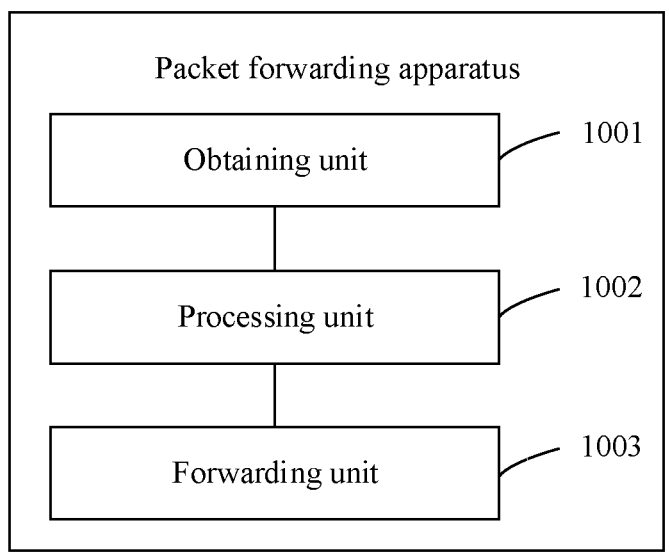
FIG. 7 is a schematic diagram of a structure of a network device according to an embodiment of this application.

An example embodiment provides a packet forwarding apparatus. The apparatus is applied to a first network device in a BGP-based network. The first network device includes a network interface. As shown in FIG. 7, the apparatus includes: an obtaining unit 1001, configured to receive a packet through the network interface, where the packet includes a source address; a processing unit 1002, configured to determine, based on the source address, a target region to which the packet belongs; and a forwarding unit 1003, configured to forward the packet when a target region to which the network interface belongs is the same as the target region to which the packet belongs.

It should be understood that, when the apparatuses provided in FIG. 6 or FIG. 7 implement functions of the apparatuses, division into the functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatus in the foregoing embodiments and the method embodiments are based on a same idea. For a specific implementation process, refer to the method embodiments, and details are not described herein again.

Figure 8:
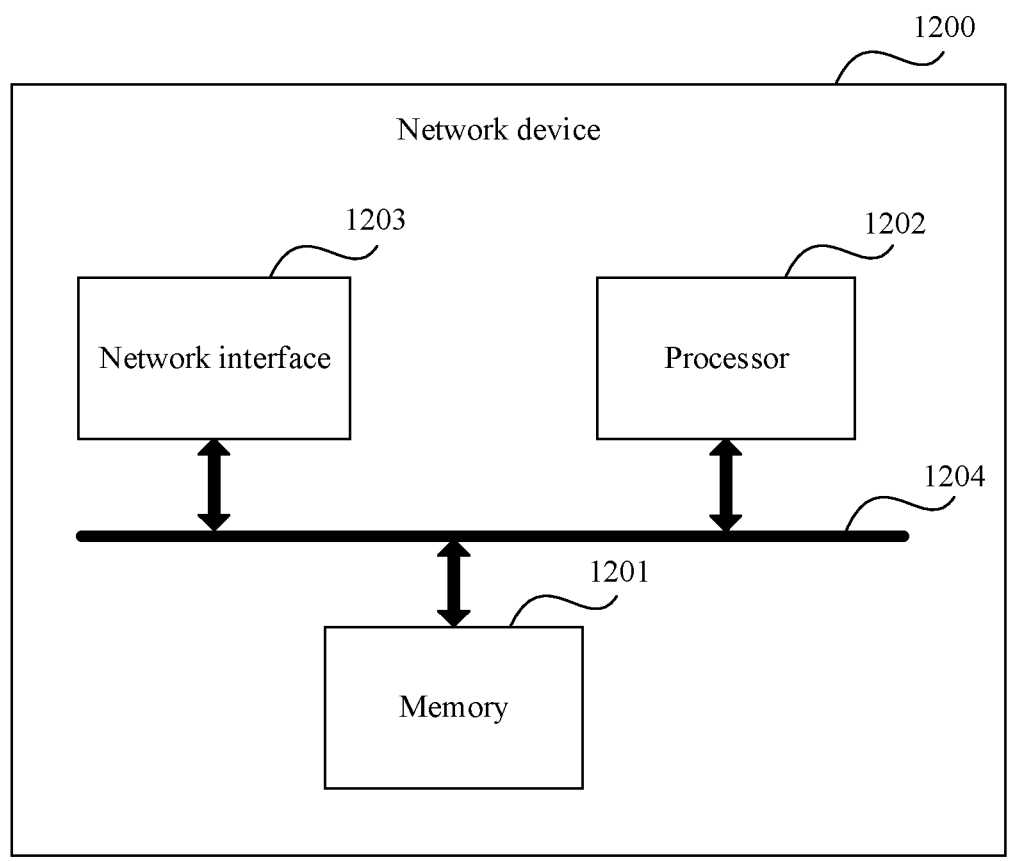
FIG. 8 is a schematic diagram of a structure of a network device according to an embodiment of this application.

FIG. 8 is a possible schematic diagram of another structure of the network device in the foregoing embodiment. The network device 1200 includes: a processor 1202, a network interface 1203, a memory 1201, and a bus 1204.

The memory 1201 is configured to store instructions. When the embodiment shown in FIG. 6 is implemented and the units described in the embodiment in FIG. 6 are implemented by using software, software or program code required for performing functions of the units in FIG. 6 is stored in the memory 1201.

The processor 1202 is configured to execute the instructions in the memory 1201 to perform the foregoing route learning method applied to the embodiment shown in FIG. 4. The processor 1202 may be a central processing unit (CPU), a general-purpose processor, a digital signal processor (DSP), an application-specific integrated circuit (ASIC), or a field-programmable gate array (FPGA), or another programmable logic device, a transistor logic device, a hardware component, or any combination thereof. The processor 1202 may implement or execute various example logical blocks, modules, and circuits described with reference to content disclosed in the embodiments of this application. Alternatively, the processor may be a combination of processors implementing a computing function, for example, including a combination of one or more microprocessors, or a combination of the DSP and a microprocessor.

The network interface 1203 is configured to communicate with another network device. The network interface 1203 may be an Ethernet interface, an Asynchronous Transfer Mode (ATM) interface, or the like.

The network interface 1203, the processor 1202, and the memory 1201 are connected to each other through the bus 1204. The bus 1204 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In a specific embodiment, the processor 1202 is configured to execute the instructions in the memory 1201. In this way, the network device 1200 obtains the first BGP routing information of a BGP route from the second network device, where the first BGP routing information includes validation information, determines, based on the validation information, the region to which the first BGP routing information belongs, and learns the first BGP routing information when the region to which the first BGP routing information belongs is the same as the region to which the second network device belongs. For a detailed processing process of the processor 1202, refer to the detailed description of the processes S210, S220, and S230 in the foregoing embodiment shown in FIG. 4. Details are not described herein again.

The network interface 1203 is used by the network device 1200 to receive routing information, and send and receive a packet by using a network system. For a detailed process, refer to the detailed description of S210, S220, and S230 in the embodiment shown in FIG. 4. Details are not described herein again.

Figure 9:
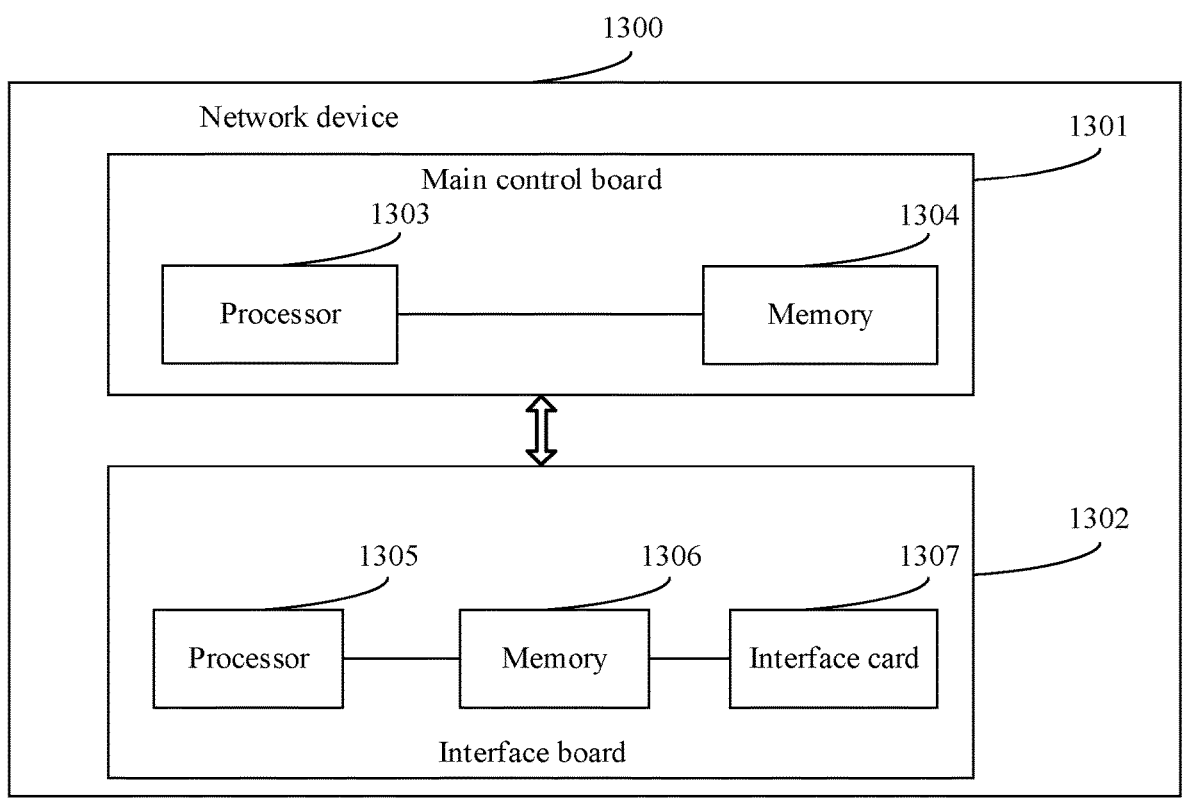
FIG. 9 is a schematic diagram of a structure of a network device according to an embodiment of this application.

FIG. 9 is a possible schematic diagram of another structure of the network device in the foregoing embodiment. The network device 1300 includes a main control board 1301 and an interface board 1302. The main control board 1301 includes a processor 1303 and a memory 1304. The interface board 1302 includes a processor 1305, a memory 1306, and an interface card 1307. The main control board 1301 and the interface board 1302 are coupled.

The hardware may implement corresponding functions of the network device in the embodiment shown in FIG. 4. For example, the memory 1306 is configured to store program code of the interface board 1302. The processor 1305 is configured to invoke the program code in the memory 1306 to trigger the interface card 1307 to perform various information receiving and sending performed by the network device in the foregoing method embodiment. The memory 1304 may be further configured to store program code of the main control board 1301, and the processor 1303 is configured to invoke the program code in the memory 1304 to perform processing other than information receiving and sending of the network device in the foregoing method embodiment.

For example, the processor 1305 is configured to trigger the interface card 1307 to obtain the first BGP routing information from the second network device, where the first BGP routing information includes validation information. The processor 1303 determines, based on the validation information, the target region to which the first BGP routing information belongs, and learns the first BGP routing information when the target region to which the first BGP routing information belongs is the same as the target region to which the second network device belongs. The memory 1304 is configured to store the program code and data of the main control board 1301, and the memory 1306 is configured to store the program code and data of the interface board 1302.

In an example, an inter-process communication (IPC) channel is established between the main control board 1301 and the interface board 1302, and communication is performed between the main control board 1301 and the interface board 1302 through the IPC channel. For example, the main control board 1301 receives BGP routing information or a packet from the interface board 1302 through the IPC channel.

The network device 1300 may be a router, a switch, or a network device having a forwarding function. The network device 1300 can implement functions of the network device in the embodiment shown in FIG. 4. For specific execution steps, refer to the foregoing method embodiment. Details are not described herein again.

Figure 10:
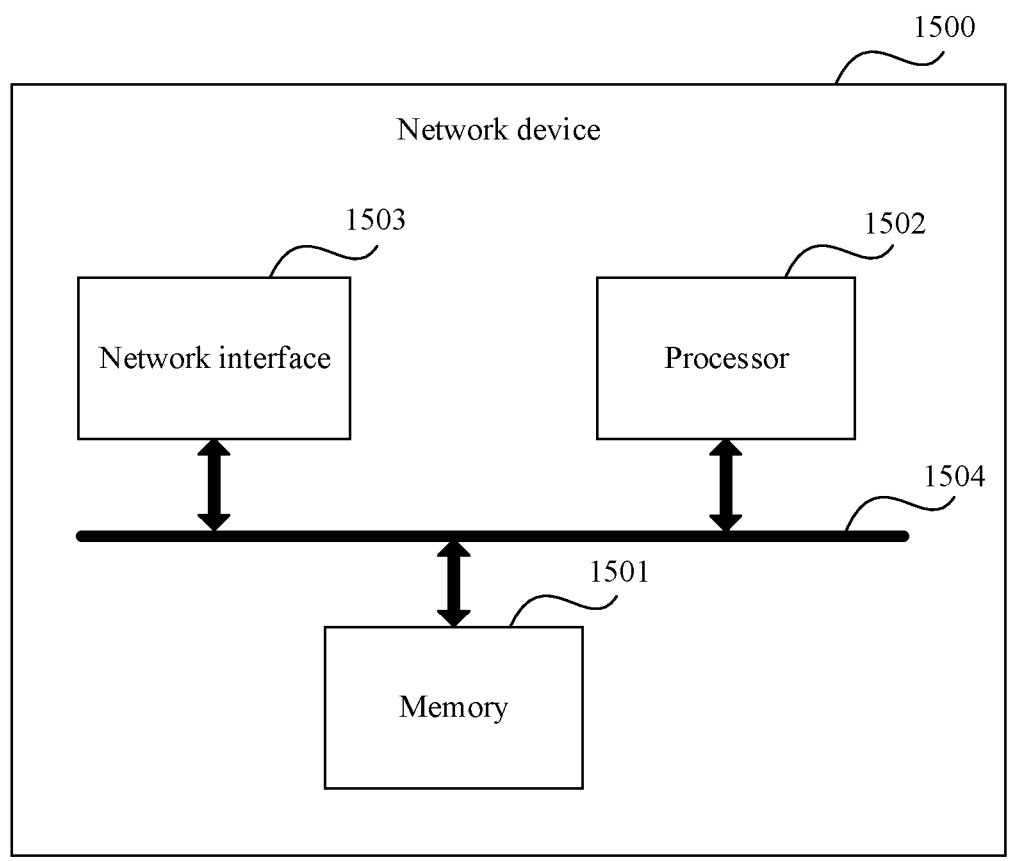
FIG. 10 is a schematic diagram of a structure of a network device according to an embodiment of this application.

FIG. 10 is a schematic diagram of a possible structure of the network device in the foregoing embodiment. The network device 1500 includes a processor 1502, a network interface 1503, a memory 1501, and a bus 1504.

The memory 1501 is configured to store instructions. When the embodiment shown in FIG. 7 is implemented and the units described in the embodiment in FIG. 7 are implemented by using software, software or program code required for performing functions of the units in FIG. 7 is stored in the memory 1501.

The processor 1502 is configured to execute the instructions in the memory 1501 to perform the foregoing packet forwarding method applied to the embodiment shown in FIG. 7. The processor 1502 may be a CPU, a general-purpose processor, a DSP, an ASIC, or a FPGA, or another programmable logic device, a transistor logic device, a hardware component, or any combination thereof. The processor 1502 may implement or execute various example logical blocks, modules, and circuits described with reference to content disclosed in the embodiments of this application. Alternatively, the processor may be a combination of processors implementing a computing function, for example, including a combination of one or more microprocessors, or a combination of the DSP and a microprocessor.

The network interface 1503 is configured to communicate with another network device. The network interface 1503 may be an Ethernet interface, an ATM interface, or the like.

The network interface 1503, the processor 1502, and the memory 1501 are connected to each other through the bus 1504. The bus 1504 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

In a specific embodiment, the processor 1502 is configured to execute the instructions in the memory 1501, so that the network device 1500 receives a packet through the network interface, where the packet includes a source address, determines, based on the source address, a target region to which the packet belongs, and forwards the packet when a target region to which the network interface belongs is the same as the target region to which the packet belongs. For a detailed processing process of the processor 1502, refer to the detailed description of the process S310, S320, and S330 in the foregoing embodiment shown in FIG. 5. Details are not described herein again.

The network interface 1503 is used by the network device 1500 to send and receive a packet by using a network system. For a detailed process, refer to the detailed description of S310, S320, and S330 in the embodiment shown in FIG. 5. Details are not described herein again.

Figure 11:
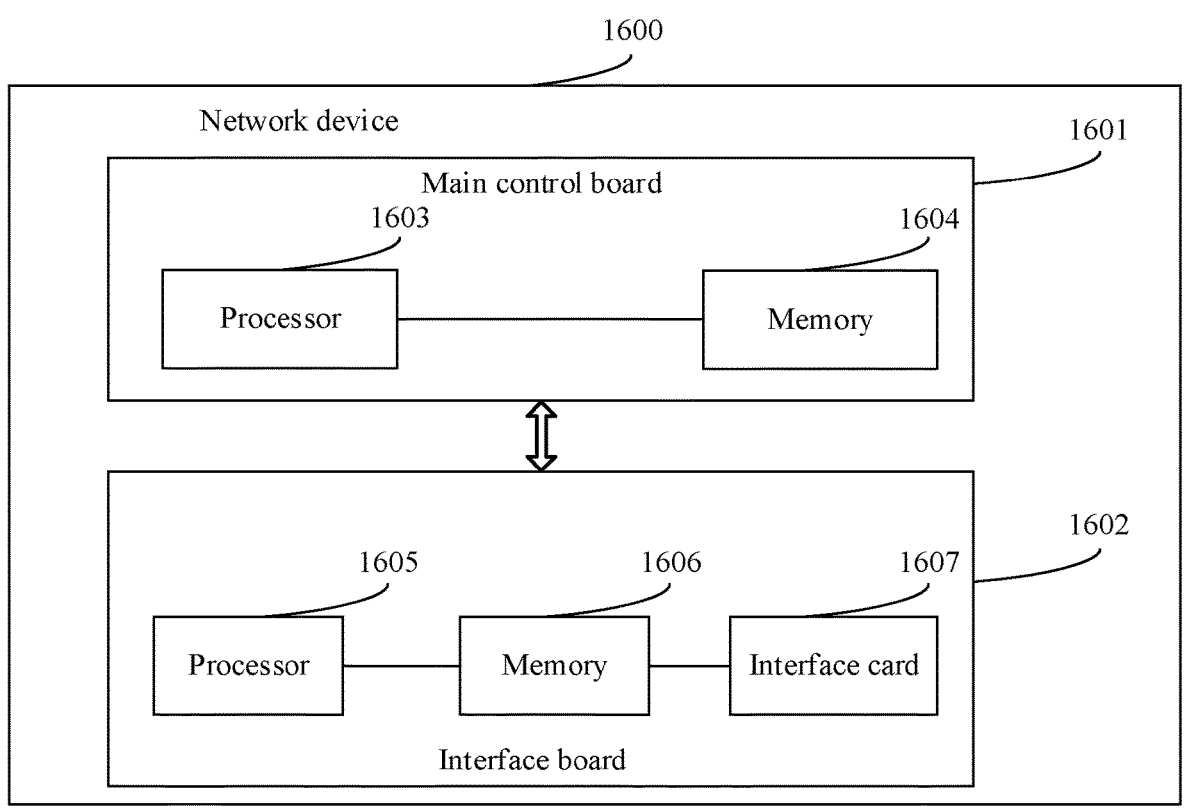
FIG. 11 is a schematic diagram of a structure of a network device according to an embodiment of this application.

FIG. 11 is a possible schematic diagram of another structure of the network device in the foregoing embodiment. The network device 1600 includes a main control board 1601 and an interface board 1602. The main control board 1601 includes a processor 1603 and a memory 1604. The interface board 1602 includes a processor 1605, a memory 1606, and an interface card 1607. The main control board 1601 and the interface board 1602 are coupled.

The hardware may implement corresponding functions of the network device in the embodiment shown in FIG. 5. For example, the memory 1606 is configured to store program code of the interface board 1602. The processor 1605 is configured to invoke the program code in the memory 1606 to trigger the interface card 1607 to perform various information receiving and sending performed by the network device in the foregoing method embodiment. The memory 1604 may be further configured to store program code of the main control board 1601, and the processor 1603 is configured to invoke the program code in the memory 1604 to perform processing other than information receiving and sending of the network device in the foregoing method embodiment.

For example, the processor 1605 is configured to trigger the interface card 1607 receiving a packet through the network interface, where the packet includes a source address, and forwards the packet when a target region to which the network interface belongs is the same as a target region to which the packet belongs. The processor 1603 is configured to determine, based on the source address, the target region to which the packet belongs. The memory 1604 is configured to store the program code and data of the main control board 1601, and the memory 1606 is configured to store the program code and data of the interface board 1602.

In an example, an IPC channel is established between the main control board 1601 and the interface board 1602, and communication is performed between the main control board 1601 and the interface board 1602 through the IPC channel. For example, the main control board 1601 receives BGP routing information or a packet from the interface board 1602 through the IPC channel.

The network device 1600 may be a router, a switch, or a network device having a forwarding function. The network device 1600 can implement functions of the network device in the embodiment shown in FIG. 5. For specific execution steps, refer to the foregoing method embodiment. Details are not described herein again.

An embodiment of this application further provides a non-transient storage medium, configured to store software instructions used in the foregoing embodiments. The non-transient storage medium includes a program used to perform the methods shown in the foregoing embodiments. When the program is executed on a computer or a network device, the computer or the network device is enabled to perform the methods in the foregoing method embodiments.

An embodiment of this application further provides a computer program product including computer program instructions. When the computer program product runs on a network node, the network node is enabled to perform the methods in the foregoing method embodiments.

"First" in the first network device in the embodiments of this application is merely used as a name identifier, and does not represent the first in sequence. The rule is also applicable to "second", "third", and the like.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the network node embodiments provided by this application, connection relationships between modules indicate that the modules have communications connections with each other, which may be specifically implemented as one or more communications buses or signal cables. A person of ordinary skill in the art may understand and implement the embodiments without creative efforts.

Methods or algorithm steps described in the content disclosed in this embodiment of this application may be implemented by hardware, or may be implemented by a processor by executing software instructions. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network node. Certainly, the processor and the storage medium may exist in the network node as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and benefits of this application are further described in detail in the foregoing specific embodiments. It should be understood that the foregoing description is merely specific embodiments of this application, but are not intended to limit the protection scope of this application. Any modification, equivalent replacement or improvement made based on technical solutions of this application shall fall within the protection scope of this application.

What is claimed is:

1. A route learning method implemented by a first network device in a Border Gateway Protocol (BGP)-based network, wherein the route learning method comprises:
    obtaining first BGP routing information from a second network device in the BGP-based network, wherein the first BGP routing information comprises validation information, and wherein the second network device belongs to a second target region;
    determining, based on the validation information, a first target region to which the first BGP routing information belongs;
    comparing the first target region and the second target region to determine whether the first target region is the same as the second target region;
    learning the first BGP routing information by adding the first BGP routing information to a routing table of the first network device when the first target region to which the first BGP routing information belongs is the same as the second target region to which the second network device belongs; and
    not learning the first BGP routing information when the first target region to which the first BGP routing information belongs is different from the second target region to which the second network device belongs.

2. The route learning method of claim 1, wherein when the first target region to which the first BGP routing information belongs is different from the second target region to which the second network device belongs, the route learning method further comprises:
    discarding the first BGP routing information;
    identifying the first BGP routing information as invalid; or
    setting a first priority of the first BGP routing information lower than a second priority of second BGP routing information,
    wherein the second BGP routing information belongs to a third target region that is the same as the second target region.

3. The route learning method of claim 1, wherein the validation information comprises a first original autonomous system (AS), and wherein the route learning method further comprises using a third target region to which the first original AS belongs as the first target region.

4. The route learning method of claim 3, further comprising:
    obtaining region information comprising a first mapping relationship between identification information of the second network device and the second target region to which the second network device belongs and a second mapping relationship between the first original AS and the third target region;
    determining, based on the identification information and the region information, the second target region; and
    determining, based on the first original AS and the region information, the third target region.

5. The route learning method of claim 3, wherein before using the third target region, the route learning method further comprises determining that the first original AS is the same as a second original AS, and wherein the second original AS is based on route origin authorization (ROA) data and corresponds to the first BGP routing information.

6. The route learning method of claim 1, wherein each of the first target region and the second target region comprises a region, a region confederation, or a combination of the region and the region confederation.

7. A first network device in a Border Gateway Protocol (BGP)-based network, wherein the first network device comprises:
    at least one processor; and
    one or more memories coupled to the at least one processor and configured to store computer-executable instructions that, when executed by the at least one processor, cause the first network device to:
        obtain first BGP routing information from a second network device in the BGP-based network, wherein the first BGP routing information comprises validation information, and wherein the second network device belongs to a second target region;
        determine a first target region to which the first BGP routing information belongs based on the validation information;
        compare the first target region and the second target region to determine whether the first target region is the same as the second target region;
        learn the first BGP routing information by adding the first BGP routing information to a routing table of the first network device when the first target region to which the first BGP routing information belongs is the same as the second target region to which the second network device belongs; and
        not learn the first BGP routing information when the first target region to which the first BGP routing information belongs is different from the second target region to which the second network device belongs.

8. The first network device of claim 7, wherein when the first target region to which the first BGP routing information belongs is different from the second target region to which the second network device belongs, the instructions further cause the first network device to:
    discard the first BGP routing information;
    identify the first BGP routing information as invalid; or
    set a first priority of the first BGP routing information lower than a second priority of second BGP routing information,
    wherein the second BGP routing information belongs to a third target region that is the same as the second target region.

9. The first network device of claim 7, wherein the validation information comprises a first original autonomous system (AS), and wherein the instructions further cause the first network device to use a third target region to which the first original AS belongs as the first target region.

10. The first network device of claim 9, wherein the instructions further cause the first network device to:
obtain region information comprising a first mapping relationship between identification information of the second network device and the second target region to which the second network device belongs and a second mapping relationship between the first original AS and the third target region;
determine the second target region based on the identification information and the region information; and
determine the third target region based on the first original AS and the region information.

11. The first network device of claim 9, wherein the instructions further cause the first network device to determine that the first original AS is the same as a second original AS, and wherein the second original AS is obtained from route origin authorization (ROA) data and that corresponds to the first BGP routing information.

12. The first network device of claim 7, wherein each of the first target region and the second target region comprises a region, a region confederation, or a combination of the region and the region confederation.

13. A first network device in a Border Gateway Protocol (BGP)-based network, wherein the first network device comprises:
at least one processor;
a network interface coupled to the at least one processor; and
one or more memories coupled to the at least one processor and configured to store computer-executable instructions that, when executed by the at least one processor, cause the first network device to:
receive a packet through the network interface, wherein the packet comprises a source address;
determine a first target region to which the packet belongs based on the source address and by matching a BGP prefix in BGP routing information according to a longest matching rule; and
forward the packet when a second target region to which the network interface belongs is the same as the first target region.

14. The first network device of claim 13, wherein the instructions further cause the first network device to discard the packet when the second target region is different from the first target region.

15. The first network device of claim 13, wherein the source address corresponds to first BGP routing information, wherein the first BGP routing information further comprises a first original autonomous system (AS), and wherein the instructions further cause the first network device to use a third target region to which the first original AS belongs as the first target region.

16. The first network device of claim 15, wherein the instructions further cause the first network device to:
communicate with a second network device in the BGP-based network over BGP, wherein the first network device is configured to couple to the second network device through the network interface;
obtain region information comprising a first mapping relationship between identification information of the second network device and the second target region and a second mapping relationship between the first original AS and the third target region;
determine the second target region based on the identification information and the region information; and
determine the third target region based on the first original AS and the region information.

17. The first network device of claim 15, wherein the instructions further cause the first network device to determine that the first original AS is the same as a second original AS, and wherein the second original AS is based on route origin authorization (ROA) data and corresponds to the source address.

18. A network system, comprising:
a first network device in a Border Gateway Protocol (BGP)-based network; and
a second network device configured to communicate with the first network device over BGP,
wherein the first network device is configured to:
obtain first BGP routing information from the second network device, wherein the first BGP routing information comprises validation information, and wherein the second network device belongs to a second target region;
determine a first target region to which the first BGP routing information belongs based on the validation information;
compare the first target region and the second target region to determine whether the first target region is the same as the second target region;
learn the first BGP routing information by adding the first BGP routing information to a routing table of the first network device when the first target region to which the first BGP routing information belongs is the same as the second target region to which the second network device belongs; and
not learn the first BGP routing information when the first target region to which the first BGP routing information belongs is different from the second target region to which the second network device belongs.

19. The network system of claim 18, wherein when the first target region to which the first BGP routing information belongs is different from the second target region to which the second network device belongs, the first network device is further configured to:
discard the first BGP routing information;
identify the first BGP routing information as invalid; or
set a first priority of the first BGP routing information lower than a second priority of second BGP routing information,
wherein the second BGP routing information belongs to a third target region that is the same as the second target region.

20. The network system of claim 18, wherein the validation information comprises a first original autonomous system (AS), and wherein the first network device is further configured to use a third target region to which the first original AS belongs as the first target region.

21. The network system of claim 20, wherein the first network device is further configured to:
obtain region information comprising a first mapping relationship between identification information of the second network device and the second target region to which the second network device belongs and a second mapping relationship between the first original AS and the third target region;

determine the second target region based on the identification information and the region information; and determine the third target region based on the first original AS and the region information.

22. The network system of claim 20, wherein the first network device is further configured to determine that the first original AS is the same as a second original AS, and wherein the second original AS is obtained from route origin authorization (ROA) data and corresponds to the first BGP routing information.

23. The network system of claim 18, wherein each of the first target region and the second target region comprises a region, a region confederation, or a combination of the region and the region confederation.

* * * * *